United States Patent [19]

Hibi et al.

[11] Patent Number: 5,143,358
[45] Date of Patent: Sep. 1, 1992

[54] FLUID-FILLED MOUNTING DEVICE

[75] Inventors: Masayuki Hibi, Komaki; Yoshiki Funahashi, Iwakura; Katsuhiro Goto, Komaki, all of Japan

[73] Assignee: Tokai Rubber Industries, Ltd., Aichi, Japan

[21] Appl. No.: 460,071

[22] PCT Filed: Jun. 6, 1989

[86] PCT No.: PCT/JP89/00565
§ 371 Date: Jan. 30, 1990
§ 102(e) Date: Jan. 30, 1990

[87] PCT Pub. No.: WO89/12184
PCT Pub. Date: Dec. 14, 1989

[30] Foreign Application Priority Data

Jun. 6, 1988 [JP] Japan ................... 63-138770
Dec. 7, 1988 [JP] Japan ................... 63-309115

[51] Int. Cl.⁵ ............................................. F16M 1/00
[52] U.S. Cl. ......................... 267/140.13; 180/312; 248/562; 248/636; 267/219
[58] Field of Search ............... 267/140.1 R, 140.1 A, 267/219; 180/300, 312, 902; 248/562, 636

[56] References Cited

U.S. PATENT DOCUMENTS

| | | | |
|---|---|---|---|
| 4,159,091 | 6/1979 | Le Salver et al. | 267/113 X |
| 4,570,911 | 2/1986 | Konishi | 267/140.1 A X |
| 4,605,207 | 8/1986 | Konishi | 403/225 X |
| 4,632,372 | 12/1986 | Nakajima et al. | 267/140.1 R |
| 4,850,578 | 7/1989 | Katayama et al. | 267/140.1 A |
| 4,865,299 | 9/1989 | Goto | 267/219 X |

FOREIGN PATENT DOCUMENTS

| | | | |
|---|---|---|---|
| 3638647 | 5/1987 | Fed. Rep. of Germany | 267/140.1 A |
| 55-107142 | 8/1980 | Japan . | |
| 149436 | 11/1980 | Japan | 267/140.1 A |
| 57-9340 | 1/1982 | Japan . | |
| 60-249749 | 12/1985 | Japan . | |
| 62-246639 | 10/1987 | Japan . | |
| 120932 | 5/1988 | Japan | 267/219 |
| 63-97734 | 6/1988 | Japan . | |
| 63-275827 | 11/1988 | Japan . | |

Primary Examiner—George E. A. Halvosa
Attorney, Agent, or Firm—Oliff & Berridge

[57] ABSTRACT

A mounting device such as an engine mount for automobiles, which receives various types of vibrations over a wide frequency range, is required to exhibit a low dynamic spring constant with respect to the input vibrations in a middle- to high-frequency range, while assuring high damping characteristics with respect to the input vibrations in a low frequency range. The present invention provides a fluid-filled mounting device wherein a pressure-receiving chamber (38) which receives vibrations and a variable-volume equilibrium chamber (40) are disposed between a first and a second support member (10, 14) which are elastically connected to each other by an elastic rubber body (26), such that the pressure-receiving and equilibrium chambers are filled with a predetermined non-compressible fluid, and are held in communication with each other via an orifice passage (46), and wherein a movable member (54) is movably accommodated in the pressure-receiving chamber (38) while a support member is provided for preventing the movable member (54) from contacting the inner wall of the pressure-receiving chamber (38) whereby a resonance portion having a predetermined space is formed around the movable member (54), so that the fluid is caused to flow through the resonance portion upon application of the vibrations. The mounting device according to the present invention can exhibit a high damping effect against the input vibrations in a low frequency range, due to a resonance of the fluid flowing through the orifice passage (46), and can also provide a low dynamic spring constant against the input vibrations in a middle- to high-frequency range, due to a resonance of the fluid flowing through the resonance portion formed around the movable member (54).

9 Claims, 7 Drawing Sheets

FLUID-FILLED MOUNTING DEVICE

FIELD OF THE INVENTION

The present invention relates to a fluid-filled mounting device which is charged with a fluid for damping or isolating input vibrations based on flows of the fluid, and in particular to such a fluid-filled mounting device having a simple construction, which can advantageously provide improved characteristics of isolating vibrations in a high frequency range.

BACKGROUND ART

As a type of mounting device which is interposed between members constituting a vibration transmitting system for connecting these members in a vibration damping/isolating manner, such as an engine mount or differential gear mount for automobiles, a so-called fluid-filled mounting device is known as disclosed in laid-open Publication No. 55-107142 of unexamined Japanese Patent Application. In the fluid-filled mounting device, a pressure-receiving chamber and an equilibrium chamber are provided between a first support metal member and a second support metal member which are connected integrally with each other by an elastic rubber body, such that the pressure-receiving and equilibrium chambers, are held in communication with each other via an orifice passage. The mounting device is capable of exhibiting an excellent vibration-damping effect, due to a resonance of the fluid within the orifice passage based on relative pressure changes which occur between the pressure-receiving chamber and the equilibrium chamber upon application of vibrations. Such an effect cannot be obtained by a mounting device having an elastic body alone.

When the fluid-filled mounting device as described above receives the vibrations in a frequency range which is higher than the resonance frequency of the fluid flowing through the orifice passage, the resistance to the flows of the fluid through the orifice passage is extremely increased. For example, the above-described mounting device is employed as an engine mount used for automobiles. In this case, if the resonance frequency of the fluid flowing through the orifice passage is set within a low frequency range so a to obtain improved vibration-damping characteristics against the input vibrations in the low frequency range, such as engine shakes, the dynamic spring constant of the mount is unavoidably increased when the mount receives vibrations in a high-frequency range. Thus, the engine mount suffers from considerably poor isolating capability with respect to high frequency vibrations, such as engine idling vibrations and booming noises.

There has been proposed in laid-open Publication No. 57-9340 of unexamined Japanese Patent Application and others, a so-called fluid pressure absorbing mechanism having a movable plate which is disposed between the pressure-receiving chamber and the equilibrium chamber such that the movable plate is displaceable or deformable by a predetermined distance. This mechanism is adapted to absorb a pressure change within the pressure-receiving chamber upon application of the vibrations in a high frequency range. The fluid pressure absorbing mechanism as described above, however, can exhibit a sufficient pressure absorption effect with respect to only the input vibrations having a frequency up to 200 Hz, since the surface area of the movable plate is limited, for example. Thus, it was difficult to obtain sufficient isolating capability with respect to the input vibrations in a high frequency range.

Further, laid-open Publication No. 60-249749 of unexamined Japanese Patent Application discloses another mounting device having a plate-like oscillating member which is disposed within the pressure-receiving chamber while being supported by the first or second support metal member so as to extend in a direction perpendicular to the load-receiving direction, so that an annular flow restricting passage is formed between the oscillating plate and an inner wall of the pressure-receiving chamber. Such a mounting device can provide a low dynamic spring constant when the input vibrations in a high frequency range are applied thereto, due to a resonance of the fluid flowing through the restricting passage. In the mounting device constructed as described above, however, when a load is applied to the mount in a direction inclined or perpendicular to the facing direction of the first and second support metal members, the relative displacement of the first and second support metal members is prevented due to abutting contact of the oscillating plate with the inner wall of the pressure-receiving chamber, whereby the vibration-damping capability is considerably lowered. In the worst case, the abutting contact may lead to a damage of the oscillating plate and even the mounting device. To avoid the abutting contact of the oscillating plate, the size of the plate must be limited, thereby limiting a tuning range of frequencies of the vibrations against which the mounting device can exhibit a low dynamic spring constant.

DISCLOSURE OF THE INVENTION

The present invention was developed in the light of the situations as described above. It is therefore an object of the present invention to provide a fluid-filled mounting device which is simple in construction, and which has improved damping/isolating capability with respect to vibrations over a wide frequency range, especially improved isolating capability with respect to the vibrations in a high-frequency range.

The above object is achieved according to the principle of the present invention, which provides a fluid-filled mounting device which comprises: (a) a first and a second support member which are disposed so as to be spaced apart from each other by a predetermined distance in a load-receiving direction in which a vibrational load is applied, the first and second support members being attached to respective members which are connected by the mounting device in a vibration damping or isolating manner; (b) an elastic rubber body interposed between the first and second support members, for elastically connecting the first and second support members to each other; (c) a pressure-receiving chamber and a variable-volume equilibrium chamber provided between the first and second support members, such that a partition wall extending in a direction substantially perpendicular to the load-receiving direction is disposed between the pressure-receiving and equilibrium chambers, the pressure-receiving chamber being disposed on the side of the first support member for receiving vibrations to be damped or isolated, while the equilibrium chamber being disposed on the side of the second support member, at least a part of the equilibrium chamber being constituted by a flexible diaphragm; (d) a predetermined non-compressible fluid filling the pressure-receiving chamber and the equilibrium chamber; (e) an orifice passage for connecting the pressure-receiving chamber and the equilibrium chamber with each other, so as to permit the fluid to flow between the pressure-receiving and equilibrium chambers; (f) a block-shaped movable member which is freely movably accommodated within the pressure-receiving chamber, the movable member cooperating with an inner wall of the pressure-receiving chamber to define a resonance portion having a predetermined space, through which the non-compressible fluid flows upon application of the vibrational load; and (g) support means provided between the movable member and the inner wall of the pressure-receiving chamber, for preventing an end surface of the movable member from contacting the inner wall of the pressure-receiving chamber in the load-receiving direction.

In the fluid-filled mounting device according to the present invention, when a vibrational load is applied between the first and second support members, the fluid is caused to flow repeatedly through the resonance portion formed within the pressure-receiving chamber. Since the fluid flowing through the resonance portion has the resonance frequency which can be easily tuned to a high frequency range, the mounting device can have a low dynamic spring constant due to the resonance of the fluid in the resonance portion, upon application of the middle- to high-frequency vibrations which result in a considerably increased resistance to the fluid flowing through the orifice passage.

According to the present invention, therefore, the mounting device can exhibit an effectively lowered dynamic spring constant with respect to the input vibrations in the middle- to high-frequency range, due to the resonance of the fluid flowing through the resonance portion, while assuring a desired vibration-damping effect against the input vibrations in the low frequency range, based on the resonance of the fluid flowing through the orifice passage. Thus, the present mounting device can exhibit excellent damping/isolating characteristics with respect to the vibrations over a wide frequency range.

Since the movable member is unfixedly or movably disposed in the pressure-receiving chamber, the mounting device as described above is simple in construction and easy to manufacture, and does not suffer from problems in terms of its vibration damping capability and durability, which would be caused by abutting contact of the movable member with the inner wall of the pressure-receiving chamber when a vibrational load is applied between the first and second support members in a direction inclined or perpendicular to the direction in which the two support members are opposed to each other.

According to one preferred form of the fluid-filled mounting device as described above, the non-compressible fluid has a kinematic viscosity not higher than 500 centistokes.

According to another preferred form of the fluid-filled mounting device as described above, the orifice passage is formed within the partition wall.

According to another preferred form of the fluid-filled mounting device as described above, a movable plate is supported by the partition wall such that the movable plate is positioned between the pressure-receiving chamber and the equilibrium chamber, the movable plate absorbing a pressure increase in the pressure-receiving chamber upon application of the vibrational load, based on deformation or displacement of the movable plate.

According to another preferred form of the fluid-filled mounting device as described above, opposite portions of inner surfaces of the pressure-receiving chamber which face each other in at least one direction perpendicular to the load-receiving direction are formed as tapered surfaces, such that a distance between the opposite tapered surfaces gradually increases in a vertically upward direction, and wherein the movable member has a configuration whose length is smaller than a maximum value of the distance between the opposite tapered surfaces an larger than a minimum value of the distance, and has a specific gravity larger than that of the non-compressible fluid, whereby the support means is constituted so that the movable block is supported by the tapered surfaces in abutting contact therewith.

According to another preferred form of the fluid-filled mounting device as described above, opposite portions of inner surfaces of the pressure-receiving chamber which face each other in at least one direction perpendicular to the load-receiving direction are formed as tapered surfaces, such that a distance between the opposite surfaces gradually increases in a vertically downward direction, and wherein the movable member has a configuration whose length is smaller than a maximum value of the distance between the opposite tapered surfaces and larger than a minimum value of the distance, and has a specific gravity smaller than that of the non-compressible fluid, whereby the support means is constituted so that the movable block is supported by the tapered surfaces in abutting contact therewith.

According to one specific feature of the above forms of the fluid-filled mounting device as described above, the tapered surfaces are formed as parts of a cylindrical surface whose diameter gradually increases in one of the opposite vertical directions.

According to another specific feature of the above forms of the fluid-filled mounting device as described above, the movable member is provided with a non-abutting portion at an outer circumferential surface thereof, the non-abutting portion cooperating with the inner wall of the pressure-receiving chamber to define a predetermined gap, whereby the outer circumferential surface of the movable member is prevented from contacting the inner wall of the pressure-receiving chamber, in a direction perpendicular to the load-receiving direction.

According to still another specific feature of the above forms of the fluid-filled mounting device as described above, the movable member is provided with a communication hole formed therethrough so as to extend in the load-receiving direction.

According to still another form of the fluid-filled mounting device as described above, the movable member has a specific gravity larger than that of the non-compressible fluid, and a protrusion having a predetermined height is provided on at least one of a vertically lower end surface of the movable member and a vertically lower portion of the inner wall of the pressure-receiving chamber, whereby the support means is constituted so that the movable block is supported by means of the protrusion.

Further, according to another form of the fluid-filled mounting device as described above, the movable member has a specific gravity smaller than that of the non-compressible fluid, and a protrusion having a predetermined height is provided on at least one of a vertically upper end surface of the movable member and a vertically upper portion of the inner wall of the pressure-receiving chamber, whereby the support means is constituted so that the movable block is supported by means of the protrusion.

MOST PREFERRED FORMS EMBODYING THE INVENTION

To further clarify the present invention, there will be described in detail embodiments of the present invention by reference to the drawings.

Figure 1:
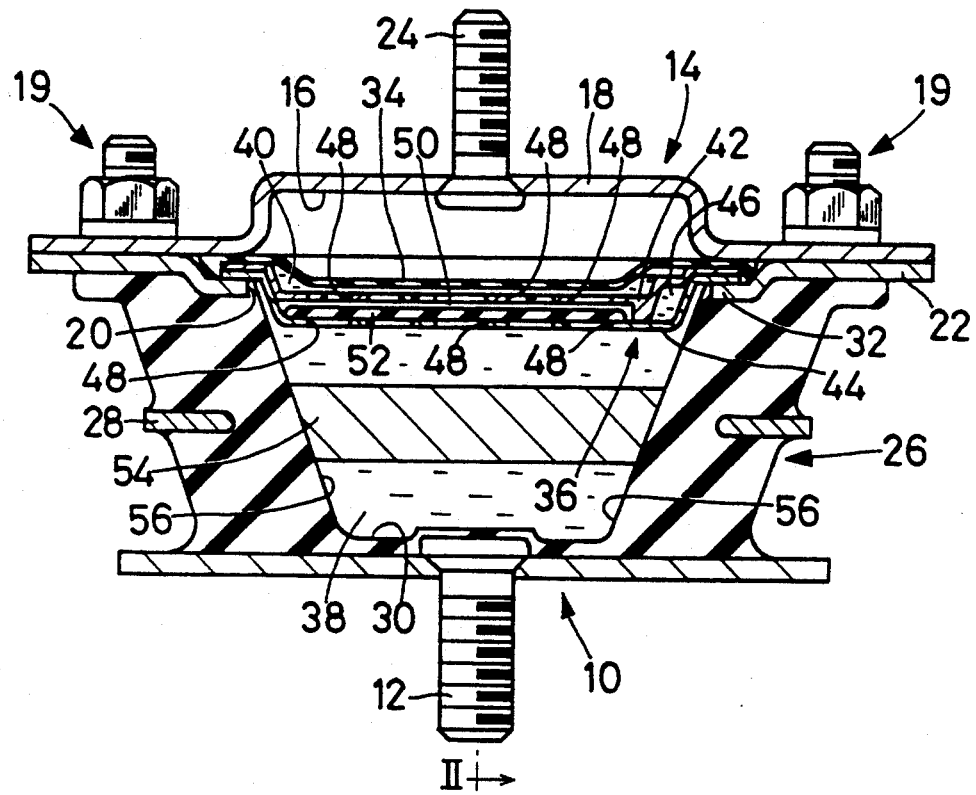
FIG. 1 is a longitudinal cross-sectional view showing one embodiment of the present invention as applied to an engine mount for automobiles.
Figure 2:
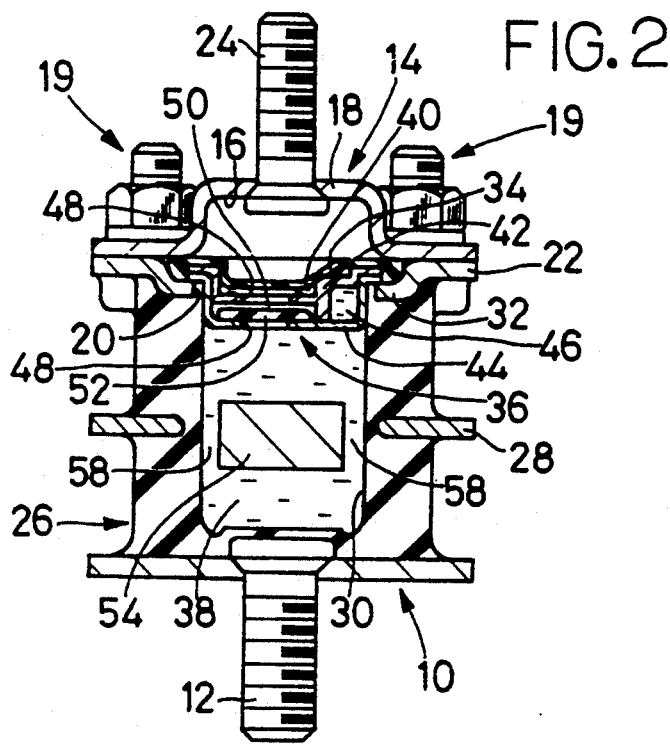
FIG. 2 is a cross-sectional view taken along the line II—II of FIG. 1.

Referring first to FIGS. 1 and 2, there is shown one embodiment of the present invention as applied to an engine mount used for an automobile. In the figures, reference numeral 10 designates a first support metal member which has a rectangular plate-like shape, and has at a central portion thereof a mounting bolt 12 which protrudes outward. In these figures, reference numeral 14 designates a second support metal member which consists of a plate-like metal member 18 whose central portion protrudes outward so as to form a rectangular recess 16, and an annular metal member 22 having a rectangular through hole 20 at a central portion thereof. The annular metal member 22 is superposed on a surface of the plate-like metal member 18 in which the recess 16 is open, and the two metal members 18, 22 are integrally assembled together by means of bolts 19. The second support metal member 14 is provided with a mounting bolt 24 which protrudes outward from the central portion of the plate-like metal member 18.

The first and second support metal members 10 and 14 are disposed relative to each other such that their surfaces from which the mounting bolts 12, 24 do not protrude are opposed to each other while being spaced apart from each other by a predetermined distance in the main load-receiving direction (in the vertical direction as seen in the figures).

Between the opposed surfaces of the first and second support metal members 10, 14, there is interposed an elastic rubber body 26. The elastic rubber body 26 has a substantially rectangular, block-like configuration. The first support metal member 10 is secured by vulcanization to one of the opposite end surfaces of the elastic body 26 as viewed in the axial direction thereof, while the annular metal member 22 as part of the second support metal member 14 is secured by vulcanization to the other end surface. Thus, the elastic body 26 serves to elastically connect the first and second support metal members 10, 14 to each other. At the intermediate portion of the outer circumference of the elastic body 26, there is embedded a rectangular annular reinforcing metal member 28 for limiting the amount of deformation of the elastic body 26.

Further, the elastic rubber body 26 has a cavity 30 formed therein, which extends over the almost entire length of the elastic body 26 as viewed in the opposing direction of the first and second metal members 10, 14, and which has an opening on the side of the second metal member 14. The cavity 30 is open to the recess 16 of the plate-like metal member 18, through the through hole 20 of the annular metal member 22.

On the other hand, the annular metal member 22 as part of the second support metal member 14 has at its inner peripheral portion an annular holder portion 32 which is bent toward the first support metal member 10 and spaced apart from the surface of the plate-like metal member 18. A diaphragm 34 consisting of an elastic rubber membrane is provided such that its outer peripheral portion is fluid-tightly gripped by and between the holder portion 32 of the annular metal member 22 and the plate-like metal member 18. Thus, the through hole 20 of the annular metal member 22 is closed by the diaphragm 34, to thereby form a fluid-tightly enclosed space within the cavity 30 of the elastic rubber body 26.

The fluid-tightly enclosed space is filled with a suitable non-compressible fluid. It is desirable that the non-compressible fluid has a kinematic viscosity not higher than 500 centistokes, preferably, not higher than 200 centistokes, and more preferably, not higher than 20 centistokes, for assuring sufficient fluidity of the fluid. For example, a non-compressible fluid such as water, ethylene glycol, propylene glycol or other alkylene glycol, polyalkylene glycol having low viscosity, silicon oil having low viscosity, or mixture thereof is suitably employed.

Further, the second support metal member 14 is provided with a partition member 36 such that the outer peripheral portion of the partition member 36 is fluid-tightly gripped, together with that of the diaphragm 34, by and between the holder portion 32 of the annular metal member 22 and the plate-like metal member 18. The partition member 36 is adapted to divide the fluid-tightly enclosed space into a pressure-receiving chamber 38 located on the side of the first support metal member 10, and an equilibrium chamber 40 located on the side of the diaphragm 34. When a vibrational load is applied between the first and second support metal members 10, 14, the volume of the pressure-receiving chamber 38 is changed due to elastic deformation of the elastic rubber body 26, whereby a pressure change in the pressure-receiving chamber 38 is induced. On the other hand, a pressure change in the equilibrium chamber 40 can be avoided since the elastic deformation of the diaphragm 34 allows a change in the volume of the equilibrium chamber 40.

The partition member 36 includes two partition plates 42, 44 which are superposed on each other in the load-receiving direction. Between the outer peripheral portions of the mutually facing surfaces of the partition plates 42, 44, there is formed an orifice passage 46 which extends over substantially a half of the circumference of the partition member 36, and communicates at opposite ends thereof with the pressure-receiving chamber 38 and the equilibrium chamber 40.

Between the facing surfaces of the partition plates 42, 44 except those portions defining the orifice passage 46, there is defined a communication space 50 which is held in communication with the pressure-receiving chamber 38 and the equilibrium chamber 40 through a plurality of communication holes 48 formed through the partition plates 42, 44. A thin movable plate 52 is accommodated in the communication space 50, such that the plate 52 is displaceable by a predetermine distance in the direction of superposition of the partition plates 42, 44. Thus, a so-called fluid pressure absorbing mechanism is constructed so as to avoid a pressure increase within the pressure-receiving chamber 38, based on fluid flows through the communication holes 48 and the communication space 50, which take place due to the displacement of the movable plate 52.

As well known in the art, when a vibrational load is applied between the first and second support metal members 10, 14 of the present engine mount, there arise flows of the fluid through the orifice passage 46, or the communication holes 48 and the communication space 50, based on a relative pressure difference between the pressure-receiving and equilibrium chambers 38, 40 which is caused by the pressure change in the pressure-receiving chamber 38. Thus, the engine mount can exhibit suitable vibration damping and isolating effects based on the flows and resonance of the fluid, with respect to the vibrations over predetermined frequency ranges to which the orifice passage 46 and the communication holes 48 are respectively tuned. Particularly, in the engine mount of the present embodiment, the resonance frequency of the fluid which flows through the orifice passage 46 is set at about 15 Hz, and the resonance frequency of the fluid which flows through the communication holes 48 and the communication space 50 is set at about 200 Hz. Therefore, the elastic mount provides high damping characteristics with respect to the input vibrations in a low frequency range, such as engine shakes or bounces, and low dynamic spring characteristics with respect to the input vibrations in a middle frequency range, such as booming noises and road-oriented noises. Thus, the present engine mount exhibits excellent vibration damping and isolating effects.

Figure 3:
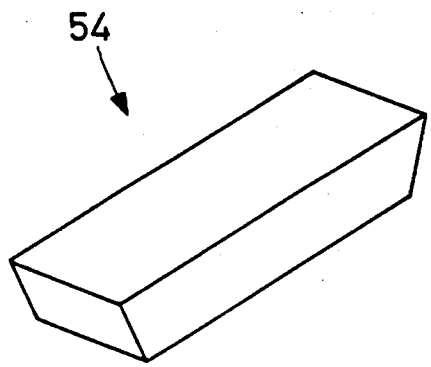
FIG. 3 is a perspective view of a movable block used in the engine mount of FIG. 1.

The engine mount as described above further includes a movable block 54 assuming a relatively thick, rectangular plate-like configuration, as shown in FIG. 3. The movable block 54 is unfixedly accommodated within the pressure-receiving chamber 38. In the instant embodiment, the movable block 54 is formed of a material having a specific gravity larger than that of the above-indicted non-compressible fluid filling the pressure-receiving chamber 38, whereby the movable block 54 is kept submerged within the mass of the fluid in the pressure-receiving chamber 38 in the vertically downward direction while no vibrations are applied to the mount.

In this embodiment, the elastic body 26 defines circumferential sides of the pressure-receiving chamber 38 accommodating the movable block 54, each side extending in a direction perpendicular to the load-receiving direction. The longitudinally opposite wall portions of the elastic body 26 are tapered so as to expand in a direction from the first support metal member 10 toward the second support metal member 14. Namely, the longitudinally opposite inner surfaces of the elastic body 26 defining the inner walls of the pressure-receiving chamber 38 are formed as tapered surfaces 56, 56 such that a distance between the surfaces 56, 56 gradually increases in the direction from the first support metal member 10 toward the second support metal member 14.

On the other hand, the movable block 54 has a longitudinal dimension which is about intermediate between the maximum and minimum distances between the opposite tapered surfaces 56, 56 of the pressure-receiving chamber 38, and has longitudinally opposite end surfaces which are tapered so as to conform with the taper of the corresponding tapered surfaces 56 of the pressure-receiving chamber 38.

In this arrangement, the longitudinally opposite end surfaces of the movable block 54 are held in abutting contact with the tapered surfaces 56, 56 of the pressure-receiving chamber 38, whereby the movable block 54 is guided to and supported at the intermediate portion of the chamber 38 as viewed in the load-receiving direction, as shown in FIGS. 1 and 2. Accordingly, the lower surface of the movable block 54 is prevented from contacting the bottom wall of the pressure-receiving chamber 38, while the movable block 54 is permitted to move freely away from the position of support by the tapered surfaces 56, 56, in the vertically upward direction (upwardly a viewed in FIG. 1) in which the tapered surfaces 56, 56 expands. It will be apparent from the above description of the present embodiment that the tapered surfaces 56, 56 of the pressure-receiving chamber 38 for supporting the movable block 54 constitute support means for supporting the movable block 54 such that one end surface of the movable block 54 as viewed in the main load-receiving direction is prevented from contacting the inner bottom wall of the pressure-receiving chamber 38.

In the present embodiment, in particular, the movable block 54 has a width smaller by a predetermined distance than a distance between opposite inner walls of the pressure-receiving chamber 38 which face each other in a direction perpendicular to the facing direction of the tapered surfaces 56, 56. Accordingly, the opposite side surfaces of the movable block 54 which are opposed to each other in the direction perpendicular to the main load-receiving direction and to the facing direction of the surfaces 56 are prevented from contacting the corresponding inner walls of the pressure-receiving chamber 38 while the movable block 54 is supported by the tapered surfaces 56, 56 as described above, whereby a gap 58 having a predetermined size is formed between each of the widthwise side end surfaces of the movable block 54, and the inner walls of the pressure-receiving chamber 38. It will be apparent from the above description that in the present embodiment, the widthwise opposite end surfaces of the movable block 54 function as non-abutting portions which extend over the entire lengths of the movable block.

In the engine mount constructed as described above, when a vibrational load is applied between the first and second support metal members 10, 14, in the facing direction thereof, a resonance portion is formed by a space which surrounds the movable block 54 and which includes the gap 58, so that the fluid flows through the resonance portion, based on deformation of the inner wall of the pressure-receiving chamber 38 due to the elastic deformation of the elastic rubber body 26, and based on displacement of the movable block 54. Especially, since the movable block 54 is supported at the intermediate position of the pressure-receiving chamber 38 without contacting the non-tapered inner surfaces of the pressure-receiving chamber 38, the fluid flows and other phenomena which occur upon application of the vibrations effectively cause the movable block 54 to move or float within the pressure-receiving chamber 38 and effectively induce the fluid flows around the movable block 54.

In this instance, the resonance frequency of the fluid flowing around the movable block 54 can be set within a sufficiently high frequency range, by adjusting the configuration and the specific gravity of the movable block 54, depending upon the elasticity of the mount body, the configuration of the pressure-receiving chamber 38, the kinematic viscosity of the enclosed fluid, and others. In this specific embodiment, the resonance frequency of the fluid existing around the movable block 54 is set at about 600 Hz, whereby the engine mount can exhibit an excellent vibration isolating effect, providing a low dynamic spring constant with respect to the input vibrations in an accordingly high frequency range, such as sounds transmitted through the engine and road-oriented noises.

Accordingly, the engine mount of the present embodiment constructed as described above can effectively provide soft spring characteristics with respect to the input vibrations over a wide frequency range including middle and high frequencies, while assuring a sufficient vibration-damping effect against the input vibrations in a low frequency range. Thus, it is possible to reduce the vibration transmitted through the mount, thereby considerably improving the freedom from noises in the interior of the vehicle body and the driving comfort of the automobile.

Figure 4:
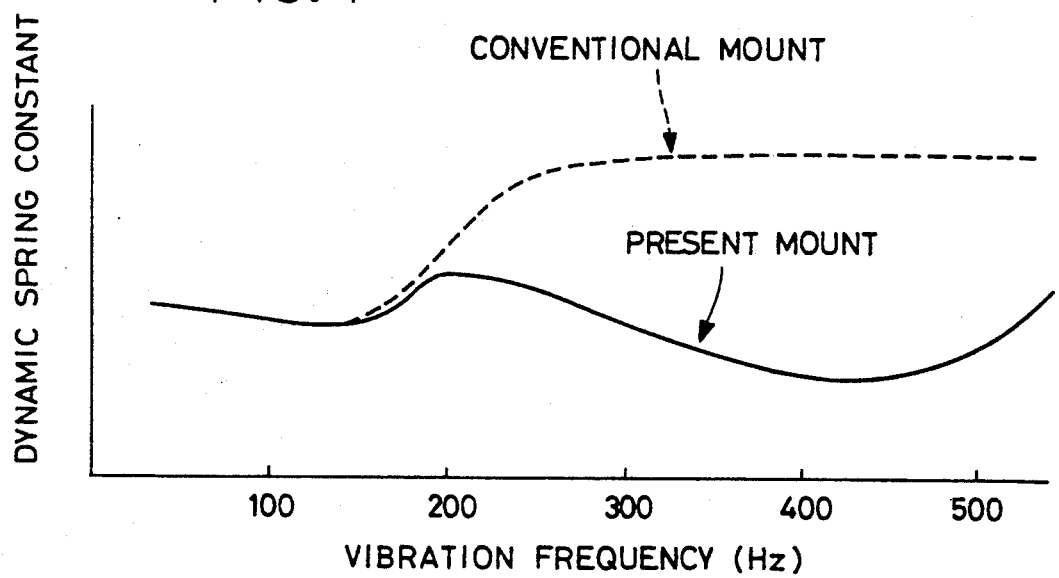
FIG. 4 is a graph showing the vibration-isolating characteristics of the engine mount of FIG. 1.

Referring to FIG. 4, there is shown the vibration isolating characteristics of the present engine mount with respect to the vibrations in the middle- to high-frequency range, together with the vibration isolating characteristics of the conventional engine mount in which the movable block 54 is not provided within the pressure-receiving chamber 38.

It will be easily understood from FIG. 4 that the engine mount of the present embodiment exhibits a reduced dynamic spring constant with respect to the vibrations over a considerably wide frequency range including the middle- and high frequencies.

Also, the engine mount as described above has an extremely simple construction and can be easily assembled since the present engine mount can be obtained by merely using the movable block 54 having a suitable configuration accommodated in the pressure-receiving chamber 38, as compared with the conventional engine mount. Therefore, the present engine mount has excellent advantages, such as improved isolating characteristics with respect to the high-frequency vibrations, and minimization of structural complication of the mount and increase in the cost of manufacture thereof.

Further, in the engine mount as described above, since the movable block 54 is accommodated in the pressure-receiving chamber 38 without being fixed to either of the first or second support metal member 10, 14, the vibration damping capability of the mount is not deteriorated by the abutting contact of the movable block 54 with respect to the inner wall surfaces of the pressure-receiving chamber 38, even when a vibrational load is applied between the first and second support metal members 10, 14 in a direction inclined or perpendicular to the direction in which the two members 10, 14 are opposed to each other.

In this engine mount, there is no need of particular consideration for avoiding the abutting contact of the movable block 54 with respect to the inner wall surfaces of the pressure-receiving chamber 38, upon application of a vibrational load in the direction inclined or perpendicular to the facing direction of the first and second support metal members 10, 14. Accordingly, the present engine mount has another advantage that the configuration and size of the movable block 54 can be freely designed, assuring a relatively wide tuning range of the resonance frequency of the fluid flowing around the movable block 54.

Figure 5:
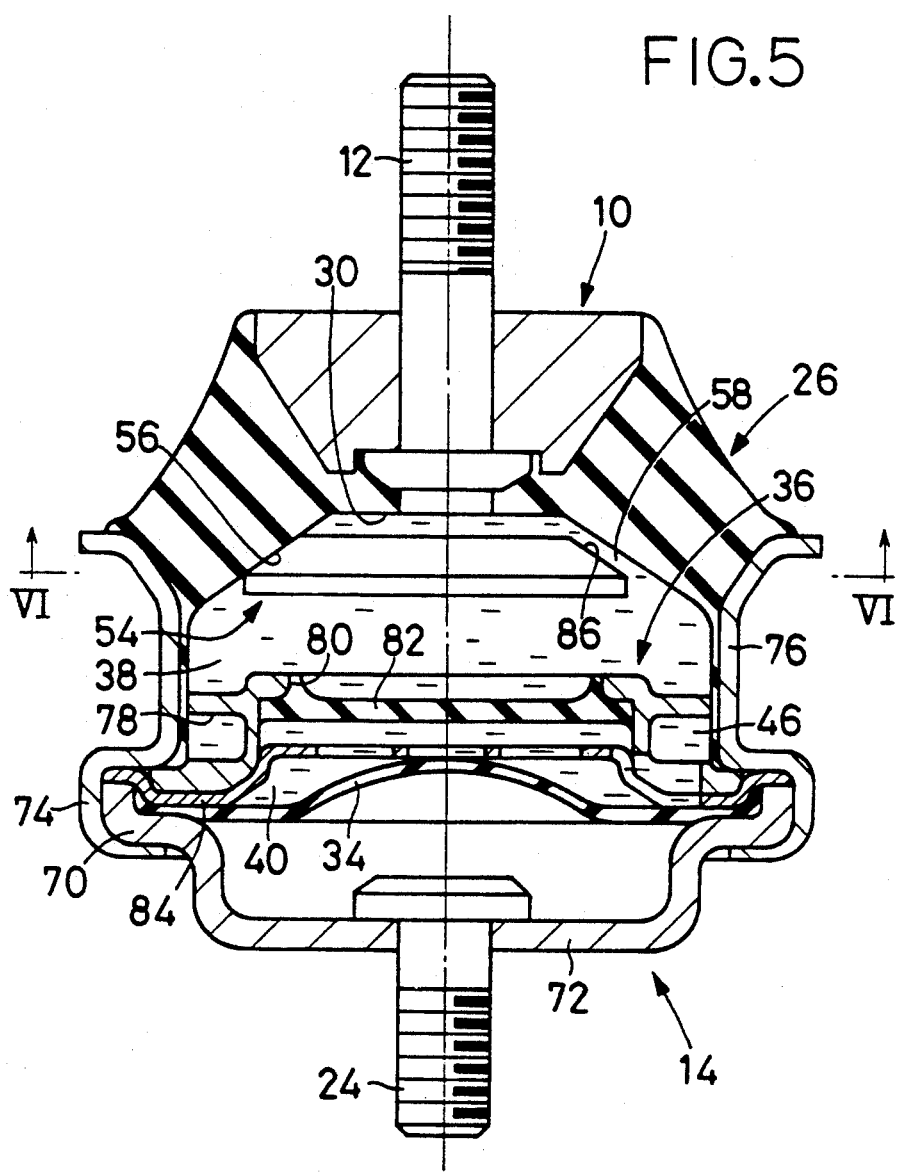
FIG. 5 is a longitudinal cross-sectional explanatory view showing another embodiment of an engine mount of the present invention, which corresponds to a cross section taken along the line V—V of FIG. 6.
Figure 6:
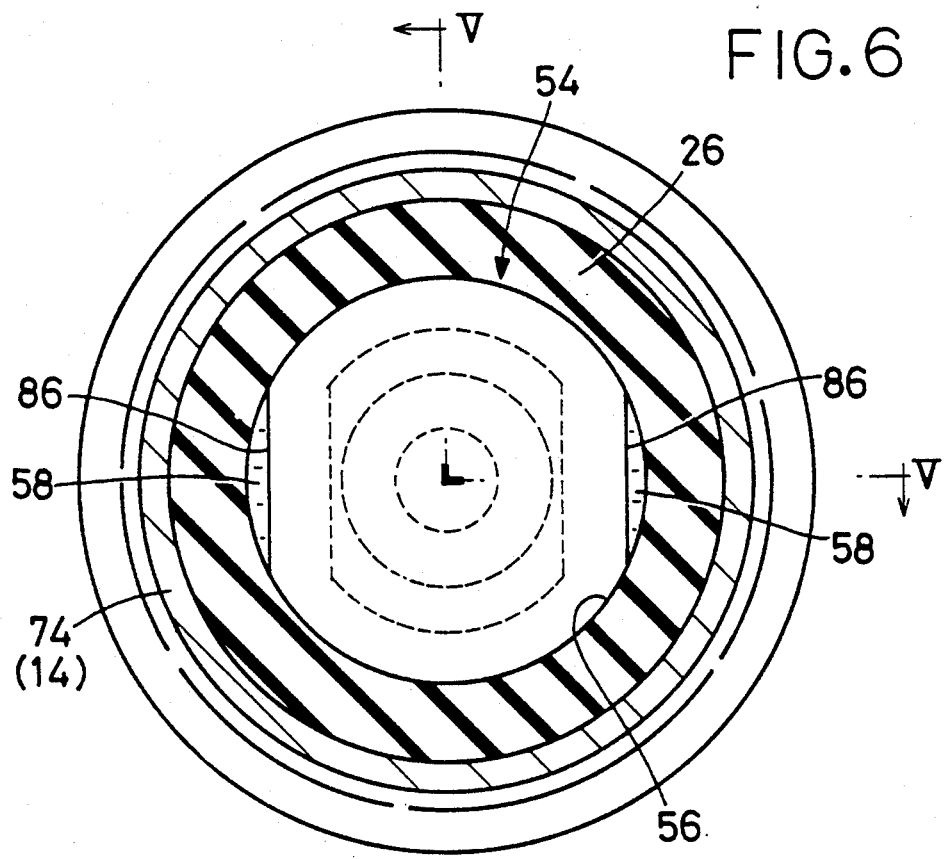
FIG. 6 is a cross-sectional view taken along the line VI—VI of FIG. 5.

In FIGS. 5 and 6, there is shown an engine mount according to another embodiment of the present invention. For easier understanding of the present embodiment, the same reference numerals as used in the above-described first embodiment are used to designate members which are similar in construction to the corresponding ones of the first embodiment.

In the engine mount of the present embodiment, a first support metal member 10 is formed as a substantially truncated cone, while a second support metal member 14 consists of a bottom metal member 72 in the form of a cylinder closed at one end, and a cylindrical metal member 76. The bottom metal member 72 has an outward flange 70 formed at an open end portion thereof, while the cylindrical metal member 76 has a caulked portion 74 which is fixed to the outward flange 70 of the bottom metal member 72. The second support metal member 14 is formed as a generally cylindrical hollow member which has a large depth and which is closed at one end.

The first and second support metal members 10, 14 are disposed in mutually facing relation while being spaced apart from each other by a predetermined distance, such that the second support metal member 14 is open toward one of opposite end faces of the first support metal member 10 which has the smaller diameter. These metal members 10, 14 are integrally connected to each other by means of an elastic rubber body 26 which is interposed therebetween and which has a substantially truncated conical shape.

The elastic rubber body 26 has a cavity 30 formed therein such that the inner wall of the cavity 30 provides a tapered surface 56, that is, a cylindrical surface whose diameter gradually increases in the direction toward the second support metal member 14. On the other hand, the second support metal member 14 is provided with a thin disk-like diaphragm 34 whose outer peripheral portion is gripped by and between the caulking portions of the bottom metal member 72 and the cylindrical metal member 76. Between the elastic rubber body 26 and the diaphragm 34, therefore, there is defined a fluid-tightly enclosed space including the cavity 30, which is filled with a suitable non-compressible fluid.

Further, a substantially disk-like partition member 36 is disposed within the fluid-tightly enclosed space such that the outer peripheral portion of the partition member 36 is gripped, together with that of the diaphragm 34, by and between the bottom metal member 72 and the cylindrical metal member 76. Thus, the fluid-tightly enclosed space is divided by the partition member 36 into a pressure-receiving chamber 38 located on the side of the first support metal member 10, and an equilibrium chamber 40 located on the side of the second support metal member 14.

The partition member 36 is provided at its outer peripheral portion with a circumferential groove 78 open in the outer circumferential surface. With an opening of the circumferential groove 78 being closed by the cylindrical metal member 76, there is formed an orifice passage 46 which extends over substantially the entire circumference of the partition member 36, and communicates with the pressure-receiving chamber 38 and the equilibrium chamber 40. Further, the partition member 36 has a through hole 80 formed through the central portion thereof. This through hole 80 is closed by an elastic rubber membrane 82 which is secured by vulcanization to the inner circumferential surface of the partition member 36, thereby constituting a fluid pressure absorbing mechanism for avoiding a pressure increase in the pressure-receiving chamber 38 upon application of the vibrations, based on elastic deformation of the elastic rubber membrane 82. In the figure, reference numeral 84 designates a deformation limiting plate for limiting the amount of deformation of the elastic rubber membrane 82.

Figure 7:
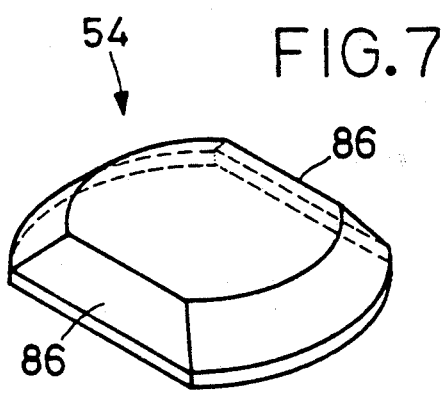
FIG. 7 is a perspective view of a movable block used in the engine mount shown in FIG. 5.

Furthermore, a movable block 54 is accommodated in the pressure-receiving chamber 38 such that the movable block 54 can move freely within the pressure-receiving chamber 38. As shown in FIG. 7, the movable block 54 assumes a generally truncated conical shape, and has the specific gravity smaller than that of the fluid filling the pressure-receiving chamber 38. Accordingly, the movable block 54 tends to float on the fluid mass, i.e., move within the pressure-receiving chamber 38 in the vertically upward direction while no vibrations are applied to the mount. In this case, a hollow structure formed of resin, metal, rubber or other materials, or a foamed body may be preferably used as the movable block 54 having the specific gravity smaller than that of the enclosed fluid.

The movable block 54 is constructed such that its outside diameter is substantially intermediate between the minimum and maximum diameters of the tapered surface 56 of the cavity 30 formed in the elastic rubber body 26. With the movable block 54 being guided to and supported at the middle portion of the cavity 30, the upper end surface of the movable block 54 is prevented from contacting the inner top wall of the pressure-receiving chamber 38. At the same time, diametrically opposite portions of the outer circumference of the movable block 54 are cut straight so as to provide a pair of tapered portions 86, 86, whereby a gap 58 is formed between each tapered portion 86 and the inner wall of the pressure-receiving chamber 38. Thus, the outer circumferential surface of the movable block 54 is also partially prevented from contacting the inner wall of the pressure-receiving chamber 38. It will be apparent from the above description that like the first embodiment, the present embodiment is adapted such that the tapered surface 56 of the pressure-receiving chamber 38 constitutes support means for supporting the movable block 54 such that the one end surface of the movable block 54 is prevented from contacting the inner wall of the pressure-receiving chamber 38 in the main load-receiving direction, while the tapered portions 86, 86 formed on the movable block 54 provide non-abutting portions which do not contact the inner wall of the pressure-receiving chamber 38, in the direction perpendicular to the load-receiving direction.

Accordingly, the engine mount of the present embodiment constructed as described above can provide a high vibration-damping effect based on the resonance of the fluid flowing through the orifice passage 46 upon application of the low frequency vibrations, and a low dynamic spring constant by the fluid pressure absorbing mechanism including the elastic rubber membrane 82 upon application of the middle frequency vibrations, as in the above-described first embodiment. In addition, upon application of the high frequency vibrations, the present engine mount can exhibit a low dynamic spring constant based on the resonance of the fluid flowing through the resonance portion formed around the movable block 54. Thus, the present invention can advantageously provide the engine mount which is capable of exhibiting excellent damping and isolating capability with respect to the vibrations over a relatively wide frequency range.

Further, the engine mount constructed according to the present embodiment is adapted such that the movable block 54 needs not to be fixed to any of the first and second support metal members 10, 14, thereby providing the advantages as provided in the first embodiment described above. That is, the present engine mount is simple in construction and easy to manufacture, and can exhibit a stable vibration damping/isolating capability, without suffering from the problem which is caused by the abutting contact between the movable block 54 and the inner wall of the pressure-receiving chamber 38, even when a vibrational load is applied in the direction inclined or perpendicular to the direction in which the first and second support metal members 10, 14 are opposed to each other.

While some preferred embodiments of the present invention have been described in detail, for illustrative purpose only, the present invention should not be confined to these specific embodiments.

Figure 8:
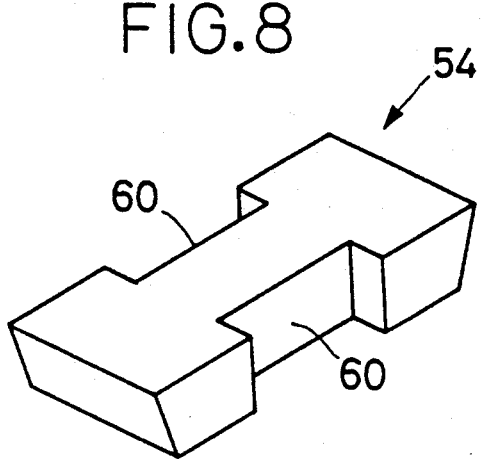
FIG. 8 is a perspective view showing another form of the movable block, which is preferably used in the engine mount shown in FIG. 1.
Figure 9:
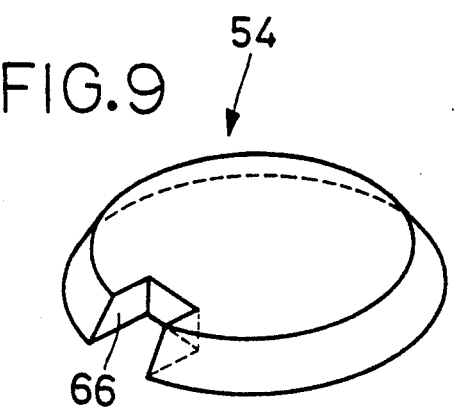
FIGS. 9 and 10 are perspective views showing further forms of the movable blocks which are preferably used in the engine mount shown in FIG. 5.
Figure 10:
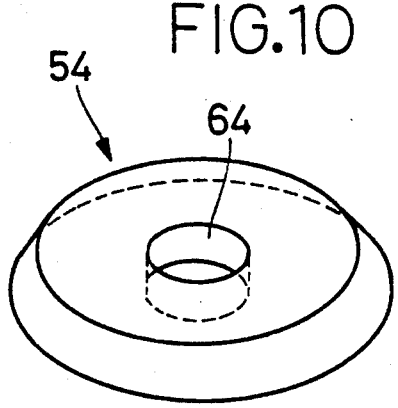

For example, the specific configuration of the movable member accommodated in the pressure-receiving chamber is never limited to those of the illustrated embodiments, but may be suitably changed according to the shape defined by the inner wall of the pressure-receiving chamber, tuning frequencies, or other factors. In order to assure a suitable resonance portion formed around the movable member, or to adequately tune the resonance frequency of the fluid flowing through the resonance portion, for example, it is effective to use movable blocks 54 as shown in FIGS. 8 and 9, which have respective cutouts 60, 66 each serving as the non-abutting portion, or a movable block 54 as shown in FIG. 10, which has a communication hole 64 formed therethrough in the load-receiving direction.

Figure 11:
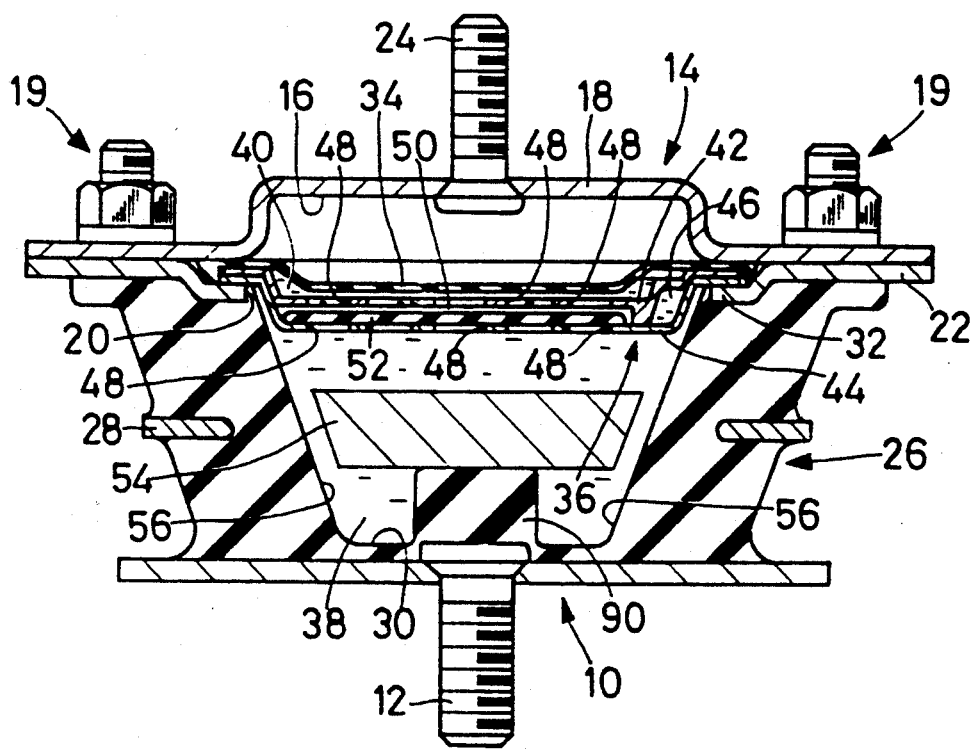
FIGS. 11 and 12 are views of further embodiments of the present invention, respectively corresponding to FIGS. 1 and 5.
Figure 12:
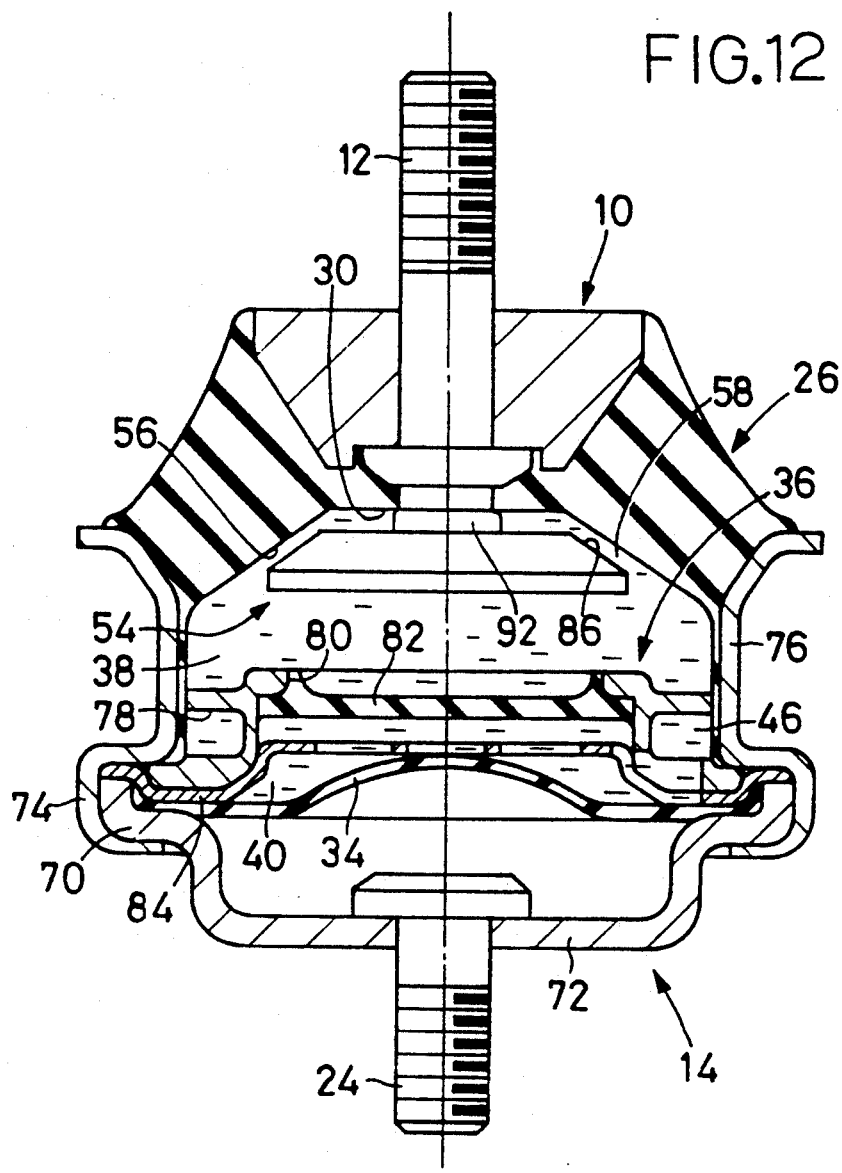

Further, the support means for preventing the lower or upper end surface of the movable member from contacting the inner wall of the pressure-receiving chamber in the main load-receiving direction is not limited to the structure in which the movable block 54 is supported by abutting contact with the tapered surface or surfaces 56 formed on the inner wall of the pressure-receiving chamber 38 which faces the outer circumferential surface of the movable block 54, as in the illustrated embodiments. For example, it is possible to form a protrusion or protrusions 90, 92 having a suitable height on the inner wall of the pressure-receiving chamber 38 or on the outer surface of the movable block 54, so as to avoid direct abutting contact of the entire upper or lower surface of the movable block 54 with the inner wall of the pressure-receiving chamber, as shown in FIGS. 11 and 12.

In the illustrated embodiment, the non-abutting portions are provided on the opposite portions of the outer circumferential surface of the movable block 54 which are opposed to each other in a direction perpendicular to the main load-receiving direction, so that the gaps 58 are formed between the outer circumferential surface of the movable block 54 and the inner surface or surfaces of the pressure-receiving chamber 38 even while the movable block 54 is supported in abutting contact with the tapered surface or surfaces 56. However, it is possible that the movable block 54 is constructed such that the entire area of its outer circumferential surface is normally in abutting contact with the inner wall of the pressure-receiving chamber 38. It is noted that if such a movable block 54 is used, a resonance portion is not effectively formed around the movable block 54 when no vibrations are applied to the mount. When a vibrational load is applied to the mount, however, a resonance portion can be formed around the movable block 54 due to elastic deformation of the elastic rubber body 26 and displacement of the movable block 54 itself.

Further, it is also possible that the movable block 54 used in the first embodiment has the specific gravity smaller than that of the charged fluid, and that the movable block 54 used in the second embodiment has the specific gravity larger than that of the fluid. In these cases, it is necessary to provide support means for the movable block 54 so as to prevent its contact with the partition member 36, by reversing the expanding direction of the tapered surface or surfaces 56 formed to define the cavity 30 of the elastic rubber body 26, for example.

The above arrangement is employed so that openings of the orifice passage 46 or the communication holes 48 can be formed through a portion of the inner wall of the pressure-receiving chamber, which portion is free from contact with the movable block 54. Accordingly, there is no possibility that the openings of the orifice passage 46 or the communication holes 48 are closed by the movable block 54.

While the illustrated embodiments employ the fluid pressure absorbing mechanism including the movable plate 52 or elastic rubber membrane 82 which is supported by the partition member 36, this mechanism is not essential to the present invention, but may be optionally employed according to various conditions such as required vibration damping/isolating characteristics. Namely, without such a fluid pressure absorbing mechanism, the present engine mount can provide sufficiently improved isolating characteristics with respect to the vibrations in the middle- to high-frequency range, especially, those in the high frequency range.

Further, it is to be understood that the present invention is applicable to various kinds of mounting device used for various apparatus, other than the engine mount as described above, and that the specific structure of the mounting device may be suitably modified. In the automotive engine mounts of the first and second embodiments, for example, it is a commonly practiced design modification to reverse the vertical positions of the first and second support metal members 10 and 14, according to the installation posture or attitude of the mount with respect to the engine unit. This modification of design is easily practiced by forming the movable block 54 in the first embodiment of a material having a specific gravity smaller than that of the charged fluid, or by forming the movable block 54 in the second embodiment of a material having a specific gravity larger than that of the fluid.

While no further embodiments will be provided, the present invention may be embodied with various modifications, changes, and improvements based on the knowledge of those skilled in the art. It goes without saying that such embodiments are installed to fall within the scope of the present invention as long as these embodiments do not depart from the scope of the present invention.

POTENTIAL INDUSTRIAL UTILITY

It will be apparent from the above description that the present invention may be advantageously applied to vibration damping/isolating support devices used in various kinds of machinery and equipment, such as an engine mount for automobiles or other motor vehicles. Thus, the present invention provides a mounting device which is capable of exhibiting excellent vibration-isolating capability with respect to the input vibrations in a considerably high frequency range, while assuring sufficient vibration-damping capability with respect to the input vibrations in a low frequency range.

We claim:
1. A fluid-filled mounting device comprising:
   a first and second support member which are disposed so as to be spaced apart from each other by a predetermined distance in a load-receiving direction in which a vibrational load is applied, said first and second support members being attached to respective members which are connected by the mounting device in a vibration damping or isolating manner;
   an elastic rubber body interposed between said first and second support members, for elastically connecting the first and second support members to each other;
   a pressure-receiving chamber and a variable-volume equilibrium chamber provided between said first and second support members, such that a partition wall extending in a direction substantially perpendicular to said load-receiving direction is disposed between said pressure-receiving and equilibrium chambers, said pressure-receiving chamber being disposed on the side of said first support member for receiving vibrations to be damped or isolated, while said equilibrium chamber being disposed on the side of said second support member, at least a part of said equilibrium chamber being constituted by a flexible diaphragm;
   a predetermined non-compressible fluid filling said pressure-receiving chamber and said equilibrium chamber;
   an orifice passage for connecting said pressure-receiving chamber and said equilibrium chamber with each other, so as to permit the fluid to flow between the pressure-receiving and equilibrium chambers;
   a block-shaped movable member which is freely movable accommodated within said pressure-receiving chamber and divides the pressure-receiving chamber into two sections, said block-shaped movable member having a pair of end surfaces opposite to each other in said load-receiving direction, one end surface disposed toward the partition wall and the other end surface disposed away from the partition wall, and a side surface connecting between said end surfaces, said side surface cooperating with an inner wall of the pressure-receiving chamber to define a resonance portion having a predetermined space through which the non-compressible fluid flows between said two sections of the pressure-receiving chamber upon application of the vibrational load to the mounting device, said movable member being biased to move in a direction away from the partition wall when the mounting device is in an operative position; and support means provided between said movable member and the inner wall of said pressure-receiving chamber, for preventing the end surface of the movable member disposed away from the partition wall from contacting the inner wall of the pressure-receiving chamber in said load-receiving direction, said support means including opposite portions of an inner wall of said elastic rubber body which face each other in at least one direction perpendicular to said load-receiving direction, said opposite portions being tapered such that a distance between the opposite tapered portions gradually decreases in said direction away from the partition wall, said movable member having a configuration whose length is smaller than a maximum value of said distance between said opposite tapered portions and larger than a minimum value of said distance, the movable member biased in said direction away from the partition wall being supported by said opposite tapered portions in abutting contact therewith.

2. A fluid-filled mounting device according to claim 1, wherein said non-compressible fluid has a kinematic viscosity not higher than 500 centistokes.

3. A fluid-filled mounting device according to claim 1, wherein said orifice passage is formed within said partition wall.

4. A fluid-filled mounting device according to claim 1, wherein a movable plate is supported by said partition wall such that the movable plate is positioned between said pressure-receiving chamber and said equilibrium chamber, said movable plate absorbing a pressure increase in the pressure-receiving chamber upon application of the vibrational load, based on deformation or displacement of the movable plate.

5. A fluid-filled mounting device according to claim 1, wherein said distance between the opposite tapered surfaces gradually increases in a vertically upward direction when the mounting device is in said operative position, said movable member having a specific gravity greater than that of said non-compressible fluid.

6. A fluid-filled mounting device according to claim 5, wherein said tapered surfaces are formed as parts of a cylindrical surface whose diameter gradually increases in one of the opposite vertical directions.

7. A fluid-filled mounting device according to claim 5, wherein said movable member is provided with a non-abutting portion at an outer circumferential surface thereof, said non-abutting portion cooperating with the inner wall of said pressure-receiving chamber to define a predetermined gap, whereby the outer circumferential surface of the movable member is prevented from contacting the inner wall of the pressure-receiving chamber, in a direction perpendicular to the load-receiving direction.

8. A fluid-filling mounting device according to claim 1, wherein said distance between the opposite tapered surfaces gradually increases in a vertically downward direction when the mounting device is in said operative position, said movable member having a specific gravity less than that of said non-compressible fluid, 9. A fluid-filled mounting device for connecting two members in a vibration damping or isolating manner, comprising:

a first and a second support member spaced apart from each other by a predetermined distance in a load-receiving direction in which a vibrational load is applied to the mounting device, said first and second support members being adapted to be attached to said two members so as to connect the two members;

an elastic rubber body interposed between said first and second support members, for elastically connecting the first and second support members to each other;

first means for defining a pressure-receiving chamber between said first and second support members, said pressure-receiving chamber receiving vibrations to be damped or isolated;

second means for defining a variable-volume equilibrium chamber between said first and second support members, said second means comprising a flexible diaphragm constituting at least a part of said equilibrium chamber;

a partition member disposed between said pressure-receiving chamber and said equilibrium chamber, said partition member extending in a direction substantially perpendicular to said load-receiving direction;

a predetermined non-compressible fluid filling said pressure-receiving chamber and said equilibrium chamber;

third means for defining an orifice passage connecting said pressure-receiving chamber and said equilibrium chamber with each other, so as to permit the fluid to flow between the pressure-receiving and equilibrium chambers;

a block-shaped movable member which is freely movably accommodated within said pressure-receiving chamber and divides the pressure-receiving chamber into two sections, said block-shaped movable member having a pair of end surfaces opposite to each other in said load-receiving direction, one end surface disposed toward the partition wall and the other end surface disposed away from the partition wall, and a communication hole formed therethrough so as to connect between said end surfaces, said fluid flowing through said communication hole between said two sections of the pressure-receiving chamber upon application of the vibrational load to the mounting device, said movable member being biased to move in a direction away from the partition wall when the mounting device is in an operative position; and support means provided between said movable member and an inner wall of said pressure-receiving chamber, for preventing the end surface of the movable member disposed away from the partition wall from contacting said inner wall of the pressure-receiving chamber in said load-receiving direction, said support means including opposite portions of an inner wall of said elastic rubber body which face each other in at least one direction perpendicular to said load-receiving direction, said opposite portions being tapered such that a distance between the opposite tapered portions gradually decreases in said direction away from the partition wall, said movable member having a configuration whose length is smaller than a maximum value of said distance between said opposite tapered portions and larger than a minimum value of said distance, the movable member biased in said direction away from the partition wall being supported by said opposite tapered portions in abutting contact therewith.

* * * * *